Sept. 10, 1968  K. L. WESTERCAMP  3,400,557
FIXED CENTER CONSTANT VELOCITY UNIVERSAL JOINT
Filed Aug. 22, 1966  2 Sheets-Sheet 1

INVENTOR.
Kenneth L. Westercamp
BY
David A. Greenlee
ATTORNEY

Sept. 10, 1968   K. L. WESTERCAMP   3,400,557
FIXED CENTER CONSTANT VELOCITY UNIVERSAL JOINT
Filed Aug. 22, 1966   2 Sheets-Sheet 2

INVENTOR.
Kenneth L. Westercamp
BY
David A. Greenlee
ATTORNEY

# United States Patent Office 3,400,557
Patented Sept. 10, 1968

3,400,557
FIXED CENTER CONSTANT VELOCITY UNIVERSAL JOINT
Kenneth L. Westercamp, Saginaw, Mich., assignor to General Motors Corporation, Detroit, Mich., a corporation of Delaware
Filed Aug. 22, 1966, Ser. No. 574,145
4 Claims. (Cl. 64—21)

ABSTRACT OF THE DISCLOSURE

A universal joint includes an outer member having a spherical bore and three axially straight cylindrical grooves; an inner member having three axially straight cylindrical grooves, an axially open central chamber and three axially open radially extended slots interconnecting the grooves and the central chamber; a spider having trunnions extending through the slots into the grooves; a plurality of balls received within the grooves; and ball-and-socket connections between the inner member and the spider and between the outer member and the spider. The inner member further includes three spherical lands engaging the outer member to establish a center of joint rotation, the lands being narrower than the width of the grooves to permit a bayonet assembly of the members.

This invention relates generally to universal joints and more specifically to a fixed center, constant velocity, ball-type universal joint.

Prior universal joints of this type have several disadvantages which have limited their practical usefulness. One such disadvantage is that some of these joints are difficult to assemble, therefore making them extremely expensive to manufacture. Another disadvantage is that the joint outer member usually comprises two parts which may result in pinching of the inner member because of assembly tolerance variances. These joints are also characterized by an excessive amount of friction between the joint members and the ball cage. This invention overcomes these prior art disadvantages and provides an easily assembled, inexpensive, low friction universal joint.

One feature of this invention is that the outer member is of unitary construction. Another feature is that the inner and outer members are designed for a bayonet-type assembly. Yet another feature is that the joint is provided with axially straight parallel grooves which permit assembly of the spider and balls axially of the assembled inner and outer joint members.

A further feature is that frictional contact between the inner and outer members is reduced to a minimum without affecting the concentricity between the inner and outer members. A yet further feature is that a ball locating spider is utilized, thus reducing joint friction.

Figure 1:
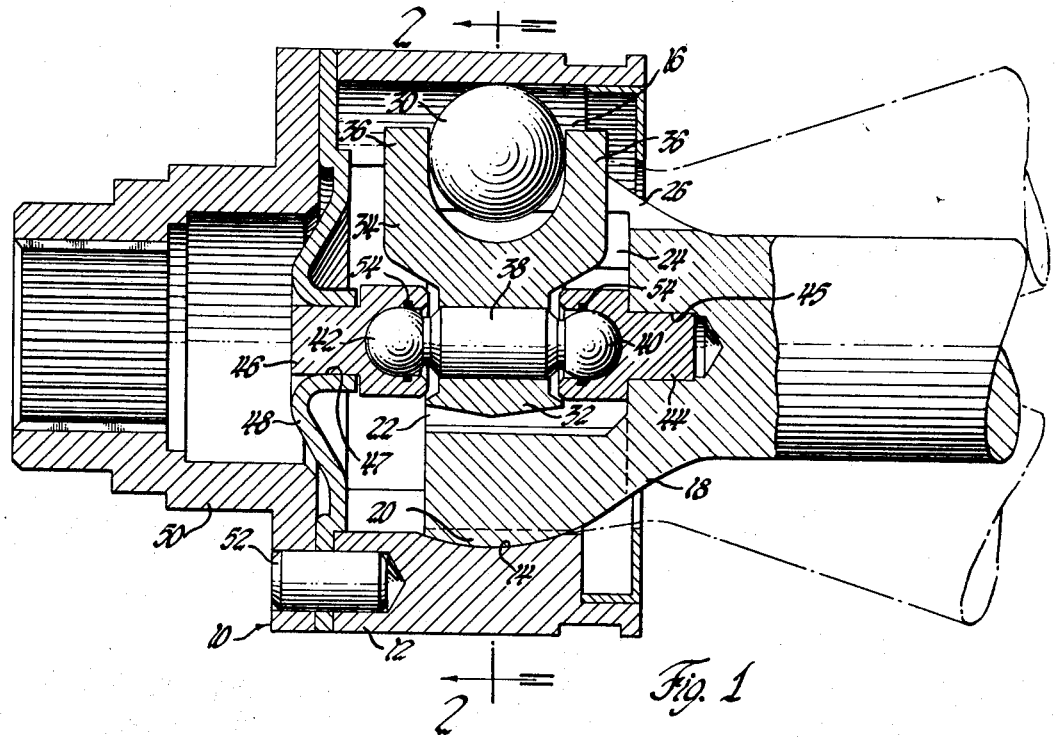
Figure 2:
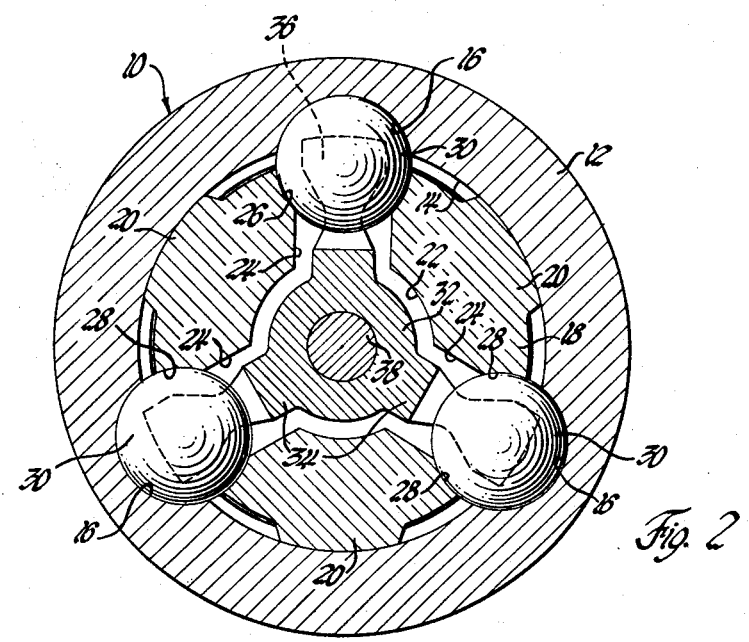
Figure 3:
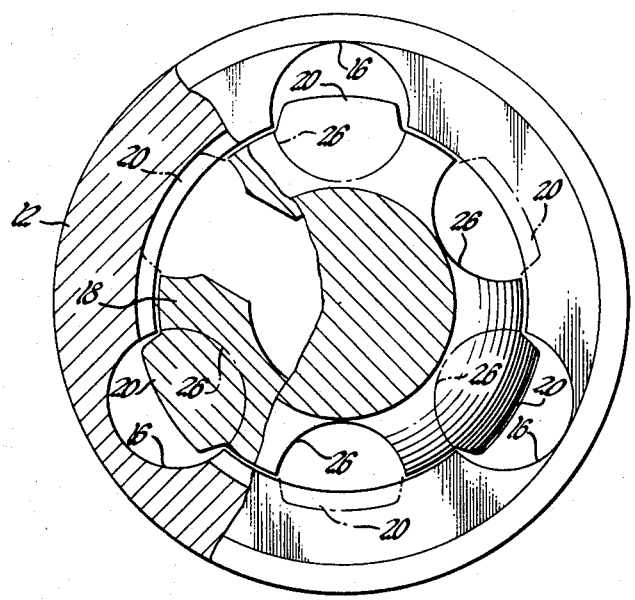
Figure 4:
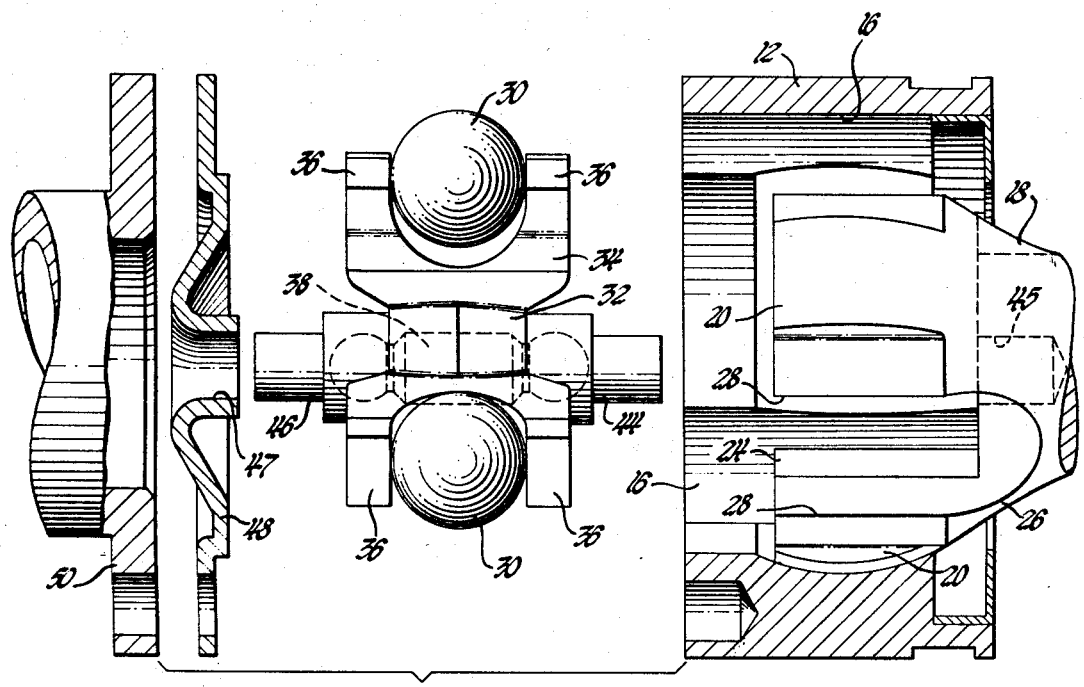

Further features of this invention will become readily apparent upon reference to the following detailed description of the attached drawings in which:

FIGURE 1 is a sectional view of a universal joint according to this invention;
FIGURE 2 is a sectional view taken generally on the plane indicated by lines 2—2 of FIGURE 1;
FIGURE 3 is a view similar to FIGURE 2 showing the assembly of the inner and outer joint members; and
FIGURE 4 is an exploded view.

Referring now to FIGURES 1 and 2 of the drawings, a universal joint 10 according to this invention includes a cylindrical outer member 12 which has a *spherical* inner surface 14. Three equally spaced straight grooves 16 are formed on the inner surface of member 12. Each groove 16 has a semi-cylindrical cross section and extends axially of member 12 and parallel to its rotational axis.

An inner member 18 is received within member 12 and includes three lands 20 which are spherically mated to surface 14. Member 18 includes an axially open central chamber 22 and three axially open radial slots 24. Each slot 24 terminates in a semicylindrical straight groove 26 which comprises part grooves 28. Each groove 26 extends axially of member 18 and lies parallel with its rotational axis. Grooves 26 are equally spaced about member 18 and are each complementary to a groove 16. Three torque transmitting members or balls 30 are received within the complementary pairs of grooves 16 and 26 to drivingly interconnect members 12 and 18.

A spider 32 is received within chamber 22 and includes three arms 34, each of which extends radially outwardly through a slot 24 and terminates in a yoke defined by a pair of fingers 36. These fingers 36 axially engage the balls 30 to maintain the balls in a coplanar relationship normal to the rotational axis of spider 32.

An articulated connection interconnects the spider and the members 12 and 18. Spider 32 carries a coaxial pin member 38 that includes terminal ball heads 40 and 42. Ball head 40 is received within a socket member 44 that is mounted in a bore 45 of inner member 18. The other ball head 42 is received within a socket member 46 which is mounted in an aperture 47 of a retaining plate 48. An adapter coupling 50 clamps retaining plate 48 to outer member 12 through connecting pins 52. Each of the ball heads 40 and 42 is spaced equidistant from the plane passing through the center of the balls 30 and is secured within its respective socket by a retaining ring 54.

Upon rotation of the joint, torque is transmitted from member 18 through balls 30 to member 12. As is well known in the art, upon angulation of the joint members, opposed grooves 16 and 26 become crossed and the balls 30 tend to roll to a position at the intersections of these grooves. Spider 30 maintains the coplanar relationship of the balls even if a pair of corresponding grooves should align. The homokinetic placement of balls 30 is assured by the aforedescribed articulated connection. Since the ball and socket connections 40, 44 and 42, 46 are equidistantly spaced from the ball plane, angulation of member 18 relative to member 12 will cause pin 38 to angulate equally with respect to both socket members 44 and 46, assuring coincidence of the ball plane and the homokinetic plane.

By utilizing a spider instead of a cage, joint friction is greatly reduced, since spider 32 contacts neither member 12 nor member 18, as would a cage. The only frictional contact in the joint, aside from the balls is that between lands 20 and spherical surface 14. These narrow lands significantly reduce frictional contact between members 12 and 18, yet provide sufficient support to accurately maintain concentricity between the members. Friction is further reduced by the use of the unitary outer member 12, which precludes any pinching or clamping of the inner member by the outer member that usually occurs with a two-piece outer member.

FIGURE 3 illustrates the bayonet-type assembly of members 12 and 18. Lands 20, which are narrower than grooves 16, are initially aligned with these grooves. Member 18 is then inserted within member 12 until spherical concentricity is achieved, as shown in solid lines. Member 18 is rotated 60° to the dashed line position in which inner grooves 26 are aligned with outer grooves 16.

FIGURE 4 shows the coaxial assembly of spider 32 to assembled members 12 and 18. The spider, pin and socket members are preassembled. Balls 30 are then placed between the pairs of spider fingers 36 and the entire subassembly is inserted axially of members 12 and 18. Such assembly is possible because of the straight axial configuration of grooves 16 and 26 and because chamber 22 and slots 24 are axially open. Plate 48 is thereafter assembled to socket member 46 and coupling 50 is secured to member 12.

Thus this invention provides a ball-type universal joint that is characterized by efficient, low friction operation and is capable of simplified assembly. While only a preferred embodiment of this invention is shown and described, further modifications are contemplated within the scope of this invention.

I claim:

1. A universal joint comprising:
   an outer member having a spherical inner surface and a plurality of equally circumferentially spaced straight grooves each parallel to the outer member rotational axis,
   an inner member having a plurality of spherical lands each narrower than the outer member grooves and engaging the spherical inner surface of the outer joint member and a plurality of straight grooves each being complementary to an outer member groove and being parallel to the inner member rotational axis, each land being located equidistant between adjacent inner member grooves to enable a bayonet-type assembly of the inner and outer members,
   a plurality of torque transmitting elements received within the inner and outer member grooves for drivingly interconnecting the inner and outer members,
   a spider carried by the inner member for positioning the torque transmitting elements in a coplanar relationship, and
   articulated means connecting the spider to the inner and outer members and locating the spider so as to position the torque transmitting elements in the homokinetic plane during relative angulation of the inner and outer members.

2. The universal joint of claim 1 wherein:
   each of the inner and outer members is provided with three grooves,
   the spider includes three arms each axially contacting a torque transmitting member and
   the inner member is formed to include an axially open central chamber and three axially open radial slots interconnecting the central chamber and the inner member grooves,
   thereby enabling the axial assembly of the spider and the torque transmitting elements to the inner and outer members.

3. The universal joint of claim 1, wherein the articulated means includes:
   first ball and socket means interconnecting the spider and the inner member, and
   second ball and socket means interconnecting the spider and the outer member.

4. The universal joint of claim 3, wherein:
   the first ball and socket means includes a ball member carried by the inner member, and
   the second ball and socket means includes a ball member carried by the spider and a socket member carried by the outer member,
   the center of each ball member being spaced equidistant from the homokinetic plane.

References Cited

UNITED STATES PATENTS

| 1,847,677 | 3/1932 | Sternbergh | 64—21 |
| 1,916,442 | 7/1933 | Rzeppa | 64—21 |
| 1,947,046 | 2/1934 | Hoffman | 64—21 |
| 2,293,717 | 8/1942 | Dodge | 64—21 |
| 2,313,279 | 3/1943 | Suczek | 64—21 |

FOREIGN PATENTS 1,175,941  11/1958  France.

HALL C. COE, *Primary Examiner.*